United States Patent
Olsson et al.

(10) Patent No.: US 10,262,021 B2
(45) Date of Patent: Apr. 16, 2019

(54) METHODS AND SYSTEMS FOR PROCESSING DATA USING QR FACTORIZATION

(71) Applicant: QlikTech International AB, Lund (SE)

(72) Inventors: Tor Oscar Johannes Olsson, Lund (SE); Tommy Michael Ivarsson, Malmö (SE); José Francisco Díaz López, Lund (SE)

(73) Assignee: QLIKTECH INTERNATIONAL AB, Lund (SE)

( * ) Notice: Subject to any disclaimer, the term of this patent is extended or adjusted under 35 U.S.C. 154(b) by 409 days.

(21) Appl. No.: 14/734,358

(22) Filed: Jun. 9, 2015

(65) Prior Publication Data

US 2015/0356132 A1 Dec. 10, 2015

Related U.S. Application Data

(60) Provisional application No. 62/009,694, filed on Jun. 9, 2014.

(51) Int. Cl.
*G06F 17/12* (2006.01)
*G06F 17/16* (2006.01)
*G06F 17/30* (2006.01)

(52) U.S. Cl.
CPC ........ *G06F 17/30365* (2013.01); *G06F 17/12* (2013.01); *G06F 17/16* (2013.01); *G06F 17/30383* (2013.01)

(58) Field of Classification Search
None
See application file for complete search history.

(56) References Cited

FOREIGN PATENT DOCUMENTS

EP 15171129 8/2014

OTHER PUBLICATIONS

D. Coppersmith and S. Winograd. "Matrix multiplication via arithmetic progressions," In Proceedings of the Nineteenth Annual ACM Symposium on Theory of Computing, STOC '87, pp. 1-6, New York, NY, USA, 1987.
Gohberg, T., et al., "Fast Gaussian elimination with partial pivoting for matrices with displacement structure," 1995 (22 pages).
Golub, et al., "Hessenberg QR via Givens" from "Matrix computations," Johns Hopkins Univ. Press. (1996) pp. 227-228.
Golub, et al., "Hessenberg QR via Givens" from "Matrix computations," Johns Hopkins Univ. Press. (1996) p. 94.
Golub, et al., "Hessenberg QR via Givens" from "Matrix computations," Johns Hopkins Univ. Press. (1996) p. 217.
Golub, et al., "Updating Matrix Factorizations" from "Matrix computations," Johns Hopkins Univ. Press. (1996) pp. 606-621.
Hammarling and Lucas, "Updating the QR Factorization and the least squares problem," Manchester Institute for Mathematical Sciences, School of Mathematics, 2008 (73 pages).

(Continued)

*Primary Examiner* — Michael D. Yaary
(74) *Attorney, Agent, or Firm* — Ballard Spahr LLP

(57) ABSTRACT

Methods and systems for processing data are disclosed. In an aspect, a first set of data can be received. A first set of intermediate data can be determined based on the first set of data. A basis for a factorization can be determined based on the first set of intermediate data. A second set of data can be received. The basis for the factorization can be updated based on the second set of data. The factorization can be performed based on the updated basis for the factorization.

26 Claims, 20 Drawing Sheets

(56) References Cited

OTHER PUBLICATIONS

Hansen, "Householder reduction of linear equations," ACM Computing Surveys, vol. 24, No. 2, Jun. 1992; p. 185-194.
Higham, "Gaussian elimination," Manchester Institute for Mathematical Sciences, School of Mathematics, 2008 (10 pages).
Huss-Lederman, et al., "Implementation of Strassen's algorithm for matrix multiplication," In in Proceedings of Supercomputing '96, (27 pages) 1996.
Response to Extended European Search Report filed on Jun. 14, 2016 for application EP 15171129, filed on Jun. 9, 2015 and published as EP 2955638 dated Dec. 16, 2015 (Applicant—QlikTech Int'l, AB // Inventor—Olsson, et al.) (8 pages).
Sauer, Timothy, "Householder reflectors," Numerical Analysis, Pearson Education Inc., George Mason University, 2006; p. 220-225.
Sauer, Timothy, "Householder reflectors," Numerical Analysis, Pearson Education Inc., George Mason University, 2006; p. 475.
Williams, "Multiplying matrices faster than Coppersmith-Winograd," In Proceedings of the Forty-Fourth Annual ACM Symposium on Theory of Computing, STOC '12, pp. 887-898, New York, NY, USA, 2012. ACM.
Extended European Search Report dated Oct. 21, 2015 for application EP 15171129, filed on Jun. 9, 2015 and published as EP 2955638 dated Dec. 16, 2015 (Applicant—QlikTech Int'l, AB // Inventor—Olsson, et al.) (6 pages).
Communication pursuant to Article 94(3) EPC dated Sep. 16, 2016 for application EP 15171129, filed on Jun. 9, 2015 and published as EP 2955638 dated Dec. 16, 2015 (Applicant—QlikTech Int'l, AB // Inventor—Olsson, et al.) (6 pages).
U.S. Appl. No. 62/009,694, filed Jun. 9, 2014, Olsson (QlikTech Int'l, AB).

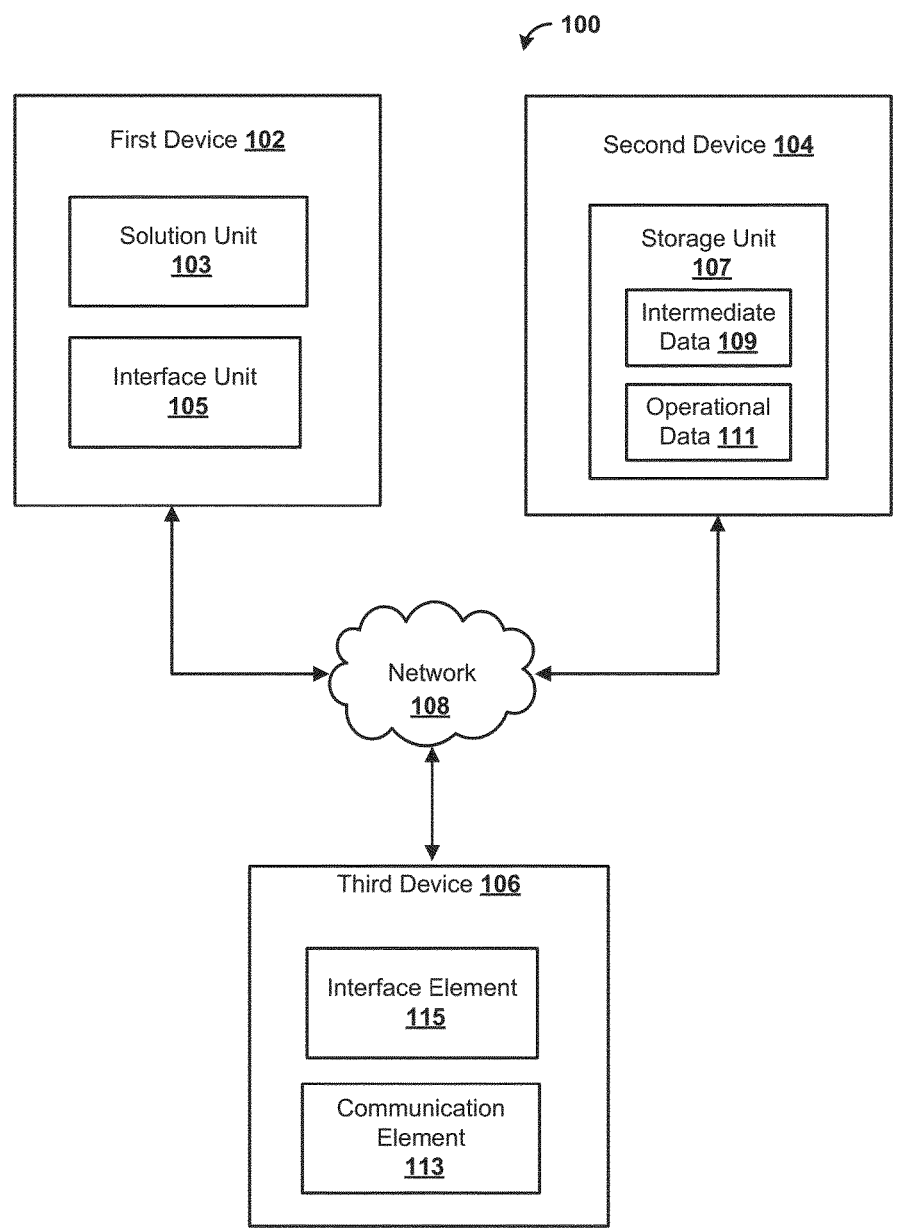

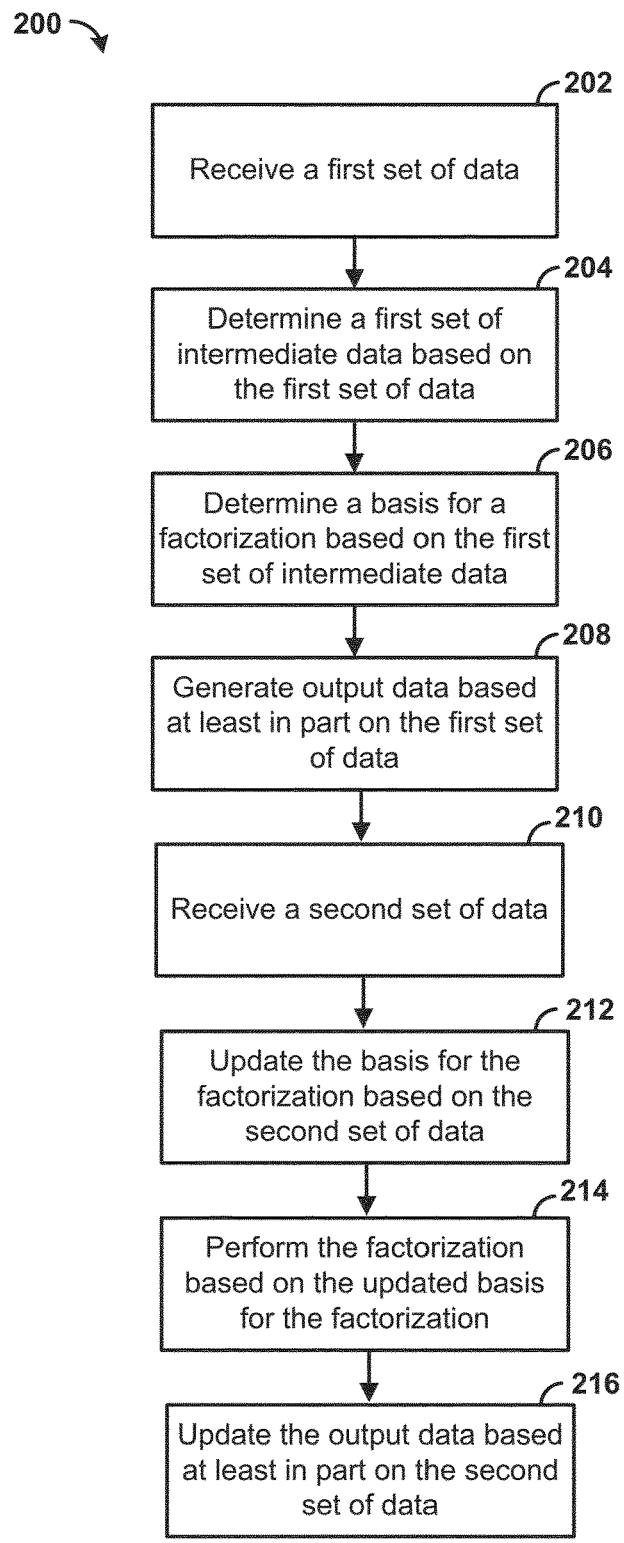

FIG. 3A

The elements of $H_1A$ $$H_1A(i,j) = \begin{cases} 0 & \text{if } j=1 \text{ and } i>1 \\ \dfrac{a_{s,1} \cdot a_{s,j}}{a_1} & \text{if } i=1 \\ a_{i,j} + \dfrac{a_{s,1}(w_1 a_{i,j} - a_{s,1} \cdot a_{s,j})}{w_1(w_1 - a_{1,1})} & \text{otherwise} \end{cases}$$

FIG. 3B

The elements of $H_1b$ $$H_1b(i) = \begin{cases} \dfrac{a_{s,1} \cdot \tilde{y}_s}{w_1} & \text{if } i=1 \\ \tilde{y}_i + \dfrac{a_{s,1}(w_1 \tilde{y}_i - a_{s,1} \cdot \tilde{y}_s)}{w_1(w_1 - a_{1,1})} & \text{otherwise} \end{cases}$$

FIG. 4A

The elements of $H_2H_1A$

Let $t_{i,j} = H_1A[i+1, j+1]$.

$$H_2H_1A[i,j] = \begin{cases} 0 & \text{if } i > j \text{ and } j \leq 2 \\ H_1A[i,j] & \text{if } i = 1 \\ \dfrac{t_{*,j} \cdot t_{*,j-1}}{w_2} & \text{if } i = 2 \text{ and } j > 1 \\ t_{i-1,j-1} + \dfrac{t_{*,i-1}(w_2 t_{i,j-1} - t_{*,j} \cdot t_{*,j-1})}{w_2(w_2 - t_{1,1})} & \text{otherwise} \end{cases}$$

$$t_{*,j} \cdot t_{*,k} = \bar{a}_{*,j+1} \cdot \bar{a}_{*,k+1} - \dfrac{(\bar{a}_{*,1} \cdot \bar{a}_{*,j+1})(\bar{a}_{*,1} \cdot \bar{a}_{*,k+1})}{(\bar{a}_{*,1} \cdot \bar{a}_{*,1})}$$

$$\bar{a}_{*,1} \cdot \bar{a}_{*,1} = w_1^2$$

FIG. 4B

The elements of $H_2H_1b$

Let $s_i = H_1b[i+1]$ and $t_{i,j} = A(H_1A)[i,j]$.

$$H_2H_1b = \begin{cases} H_1b[i] & \text{if } i = 1 \\ \dfrac{t_{*,1} \cdot s_*}{w_2} & \text{if } i = 2 \\ s_{i-1} + \dfrac{t_{*,i-1}(w_2 s_1 - t_{*,1} \cdot s_*)}{w_2(w_2 - t_{1,1})} & \text{otherwise} \end{cases}$$

$$t_{*,k} \cdot s_* = \bar{a}_{*,k+1} \cdot \bar{y}_* - \dfrac{\bar{a}_{*,1} \cdot \bar{y}_*}{\bar{a}_{*,1} \cdot \bar{a}_{*,1}} \bar{a}_{*,1} \cdot \bar{a}_{*,k+1}$$

$$\bar{a}_{*,1} \cdot \bar{a}_{*,1} = w_1^2$$

FIG. 5A

The elements of $H_k \ldots H_1 A$

Let $$t_{i,j} = H_{k-1} \ldots H_1 A[i+k-1, j+k-1]$$
$$s_{i,j} = H_{k-1} \ldots H_1 A[i+k-2, j+k-2]$$

then $$H_k \ldots H_1 A[i,j] = \begin{cases} 0 & \text{if } i > j \text{ and } j \leq k \\ H_{k-1} \ldots H_1 A[i,j] & \text{if } i < k \\ \dfrac{t_{k,1} \cdot t_{k,j-k+1}}{w_k} & \text{if } i = k \text{ and } j \geq k \\ t_{i-k+1,j-k+1} + \dfrac{t_{k-k+1,1}(w_k t_{i,j-k+1} - t_{k,1} \cdot t_{k,j-k+1})}{w_k(w_k - t_{1,1})} & \text{otherwise} \end{cases}$$

$$t_{k,q} \cdot t_{k,p} = s_{k,q+1} \cdot s_{k,p+1} - (s_{k,1} \cdot s_{k,q+1})(s_{k,1} \cdot s_{k,p+1})$$

FIG. 5B

The elements of $H_k \ldots H_1 b$

Let $$s_i = H_{k-1} \ldots H_1 b[i+k-1]$$
$$\mu_i = H_{k-1} \ldots H_1 b[i+k-2]$$
$$t_{i,j} = A(H_{k-1} \ldots H_1 A)[i,j]$$
$$\gamma_{i,j} = A(H_{k-2} \ldots H_1 A)[i,j]$$

then $$H_k \ldots H_1 b = \begin{cases} H_{k-1} \ldots H_1 b[i] & \text{if } i < k \\ \dfrac{t_{k,1} \cdot s_k}{w_k} & \text{if } i = k \\ s_{i-1} + \dfrac{t_{i-1,1}(w_k s_k - t_{k,1} \cdot s_k)}{w_k(w_k - t_{1,1})} & \text{otherwise} \end{cases}$$

$$t_{k,q} \cdot s_k = \gamma_{k,q+1} \cdot \mu_k - (\gamma_{k,1} \cdot b)(\gamma_{k,1} \cdot \gamma_{k,q+1})$$

FIG. 6

The algorithm, expressed as matrix operations

Define $U(M)$ as the upper triangular part of $M$, including the diagonal, and $I_k(c)$ as the identity matrix with the $k$-th diagonal element replaced by $c$ and let $$G_1 = I_1(\frac{1}{\sqrt{a_{*,1} \cdot a_{*,1}}}) U(A^T A)$$

$$T_1 = I_1(\frac{1}{\sqrt{a_{*,1} \cdot a_{*,1}}}) A^T b$$

$$\vec{c}_k = G_k[k, (k+1) \cdots m].$$

Then $$G_k = I_k(\frac{1}{\sqrt{G_{k-1}[k,k] - G_{k-1}[k-1,k]^2}})(G_{k-1} - U(\vec{c}_{k-1}^T \vec{c}_{k-1}))$$

$$T_k = I_k(\frac{1}{\sqrt{G_{k-1}[k,k] - G_{k-1}[k-1,k]^2}})(T_{k-1} - T_{k-1}[k-1]\vec{c}_{k-1}^T)$$

$$R = G_m$$

$$Q^T b = T_m$$

NOTE: $G_{k-1}[k,k] - G_{k-1}[k-1,k]^2 = G_k[k,k]$ and multiplying with $I_k(\frac{1}{c})$ is equivalent to dividing each element in row $k$ with the element $c$.

FIG. 7

```
function [G0,T0] = adaptiveqr_prepare(A, b)
  G0 = triu(A'*A);
  T0 = A'*b;
end
```

```
function [R,d] = adaptiveqr_factor(R, d, varargin)
  [m,~] = size(R);
  if nargin > 2
    m0 = varargin{1};
  else
    [R,d] = finalize_row(R, d, 1);
    m0 = 2;
  end
  % If starting row is greater than 2, perform facotrization
     related to the
  % starting row and below done in the iterations 2 to the
     starting row index
  for k = 2:(m0-1)
    [R,d] = eliminate_row(R, d, k, m0, m);
  end
  % Perform the factorization from the starting row
  for k = m0:m
    [R,d] = eliminate_row(R, d, k, k, m);
    [R,d] = finalize_row(R, d, k);
  end
end function [R,d] = eliminate_row(R, d, k, col, m)
    Gr = R(k-1,col:m);
    d(col:m,1) = d(col:m,1) - (d(k-1).*Gr');
    R(col:m,col:m) = R(col:m,col:m) - triu(Gr'*Gr);
end function [R,d] = finalize_row(R, d, k)
    w = sqrt(R(k,k));
    R(k,:) = R(k,:)./w;
    d(k) = d(k)/w;
end
```

```
function [x, R, d] = adaptiveqr_solve(G0, T0)
  [R,d] = adaptiveqr_factor(G0,T0);
  x = R\d;
end
```

FIG. 8A

Adding rows to a least squares system $$\begin{cases} A = \begin{bmatrix} A \\ A_a \end{bmatrix} \\ b = \begin{bmatrix} b \\ b_a \end{bmatrix} \end{cases} \Rightarrow \begin{cases} A^T A = A^T A + A_a^T A_a \\ A^T b = A^T b + A_a^T b_a \end{cases}$$

FIG. 8B

```
function [G0,T0] = adaptiveqr_add_rows(G0, T0, Ahat, Bhat)
    G0 = G0 + triu(Ahat'*Ahat);
    T0 = T0 + Ahat'*Bhat;
end
```

FIG. 9A

Deleting rows from a least squares system $$\begin{cases} A = \begin{bmatrix} A \\ A_a \end{bmatrix} \\ b = \begin{bmatrix} b \\ b_a \end{bmatrix} \end{cases} \Rightarrow \begin{cases} A^T A = A^T A - A_a^T A_a \\ A^T b = A^T b - A_a^T b_a \end{cases}$$

FIG. 9B

Matlab code for deleting rows from a QR factorization

```
function [G0, T0] = adaptiveqr_delete_rows(G0, T0, a, b)
    G0 = G0 - triu(a'*a);
    T0 = T0 - a'*b;
end
```

FIG. 10A

Adding columns to a least squares system $$A = [A \; A_0] \Rightarrow \begin{cases} A^T A = \begin{bmatrix} A^T A & A^T A_0 \\ A_0^T A & A_0^T A_0 \end{bmatrix} \\ A^T b = \begin{bmatrix} A^T b \\ A_0^T b \end{bmatrix} \end{cases}$$

FIG. 10B

```
function [G0,T0,A] = adaptiveqr_add_columns(G0,T0,A,b,cols)
  [n,m] = size(A);
  [~,p] = size(cols);
  G0(:,m+1:m+p) = A'*cols;
  G0(m+1:m+p,m+1:m+p) = triu(cols'*cols);
  T0(m+1:m+p) = cols'*b;
  A(:,m+1:m+p) = cols;
end
```

FIG. 11A

Deleting columns from a least squares system $$\begin{cases} A = \begin{bmatrix} A_1 & A_2 & A_3 \end{bmatrix} \\ A = \begin{bmatrix} A_1 & A_2 \end{bmatrix} \end{cases} \Rightarrow \begin{cases} A^T A = \begin{bmatrix} A_1^T A_1 & A_1^T A_2 \\ A_2^T A_1 & A_2^T A_2 \end{bmatrix} \\ A^T b = \begin{bmatrix} A_1^T b \\ A_2^T b \end{bmatrix} \end{cases}$$

FIG. 11B

Deleting a block of columns from the QR factorization

```
function [G0, T0] = adaptiveqr_delete_columns(G0, T0, cols)
    G0(cols,:)=[];
    G0(:,cols)=[];
    T0(cols)=[];
end
```

FIG. 12

```
Adaptive QR Insert Column Operation with 2 outputs function [R, d, G0, T0] = adaptiveqr_delete_columns2(G0, T0, R
    , d, cols)
    [G0, T0] = adaptiveqr_delete_columns(G0, T0, cols);
    [m,~] = size(G0);
    R(cols,:)=[];
    R(:,cols)=[];
    d(cols)=[];
    m0 = min(cols);
    R(m0:m,m0:m) = G0(m0:m,m0:m);
    d(m0:m) = T0(m0:m);
    [R,d] = adaptiveqr_factor(R,d,m0);
end
```

FIG. 13

```
Change in Computing elements in A function [G0, T0] = change_elem(row, col, new_e, A, B)
  [~,m] = size(old_row)
  diff_e = new_e - A(row,col);
  for c = 1:m
    if c <= col
      G0(c,col) = G0(c,col) + diff_e*A(row,c);
    else
      G0(col,c) = G0(col,c) + diff_e*A(row,c);
    end
  end
  T0(col) = T0(col) + diff_e*B(row);
```

FIG. 17

```
function [result] = test_relative_error()
    result = [];
    nbr_tests = 1000;
    cond = 10;
    rnd_space = 1000;
    for n = 100:100:1000
        fprintf('%d: ', n);
        for i = 1:nbr_tests % Generate As with K <= 10
            A = randnCond(n,n,cond,rnd_space);

% Generate x with norm(x) = 1
            x = rand(n,1)*rnd_space - rnd_space/2;
            x = x/norm(x);

% Compute b = Ax
            b = A*x;

% Compute delta_b = A*tilde_x-b
            AQR = AdaptiveQR(A,b);
            [sol_x,~,~] = AQR.solve();
            delta_b = A * sol_x - b;

% norm(tilde_x - x) <= K*norm(delta_b)/norm(b)
            result = [result; n norm(sol_x - x) cond * norm(
                delta_b) / norm(b)];
            fprintf('.');
        end
        fprintf('\n');
    end
end
```

FIG. 18

```
Listing 11: Testing the delta space function [result] = test_delta_space(test_sizes,
    tests_per_size)
  rnd_space = 1000;
  result = [];
  for n = test_sizes
    fprintf('n=%d', n);
    A = randnCond(n,n,1,rnd_space);
    for i = 1:tests_per_size
      B = randnCond(n,1,1,rnd_space);
      AQR = AdaptiveQR(A,B);
      [x,~,~] = AQR.solve();
      xn = norm(x);
      bn = norm(B);
      result = [result; n xn bn];
      fprintf('.');
```

METHODS AND SYSTEMS FOR PROCESSING DATA USING QR FACTORIZATION

CROSS REFERENCE TO RELATED PATENT APPLICATION

This application claims priority to U.S. Provisional Application No. 62/009,694 filed Jun. 9, 2014, herein incorporated by reference in its entirety.

BACKGROUND

Processing data involving matrices, equations, or other data sets with large condition numbers can be time consuming. In addition, computationally intensive calculations can introduce errors, and therefore decreasing data processing efficiency and accuracy. There is a need for more sophisticated methods and systems for reusing previously generated computationally intensive calculations.

SUMMARY

It is to be understood that both the following general description and the following detailed description are exemplary and explanatory only and are not restrictive, as claimed. Provided are methods and systems for processing data.

In an aspect, a first set of data can be received. A first set of intermediate data can be determined based on the first set of data. A basis for a factorization can be determined based on the first set of intermediate data. A second set of data can be received. The basis for the factorization can be updated based on the second set of data. The factorization can be performed based on the updated basis for the factorization.

In another aspect, a first set of data and a second set of data can be received. In an aspect, the first set of data can be associated with a basis for a factorization. A modification to a matrix associated with the first set of data can be determined based on the second set of data. The basis for the factorization can be updated based on the modification to the matrix associated with the first set of data. The factorization can be performed using the updated basis for the factorization. In an aspect, output data can be generated based on the factorization.

In another aspect, a request to solve one or more equations related to first data can be received. First intermediate data can be generated based on an algorithm configured to solve the one or more equations. An update to the first data can be received. An operation can be applied to the first intermediate data resulting in second intermediate data. In an aspect, the operation can be applied based on the update to the first data. A first solution to the one or more equations can be determined based on the second intermediate data and the algorithm.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1 is a block diagram of an example system configured to solve a data set;

FIG. 2 is a flowchart illustrating an example method for processing data;

FIG. 3A illustrates example mathematical operations for calculations of one or more elements of an intermediate matrix resulting from the first iteration using a Householder reflection algorithm;

FIG. 3B illustrates example mathematical operations for calculations of one or more elements of another intermediate matrix resulting from the first iteration using a Householder reflection algorithm;

FIG. 4A illustrates example mathematical operations for calculations of one or more elements of an intermediate matrix resulting from the second iteration using a Householder reflection algorithm;

FIG. 4B illustrates example mathematical operations for calculations of one or more elements of another intermediate matrix resulting from the second iteration using a Householder reflection algorithm;

FIG. 5A illustrates example mathematical operations for calculations of one or more elements of a matrix resulting from the $k^{th}$ iteration using a Householder reflection algorithm;

FIG. 5B illustrates example mathematical operations for calculations of one or more elements of another matrix resulting from the $k^{th}$ iteration using a Householder reflection algorithm;

FIG. 6 illustrates example mathematical operations for calculating a basis for a factorization;

FIG. 7 illustrates an example MATLAB implementation for calculating a basis for a factorization and for performing the factorization;

FIG. 8A illustrates example mathematical operations for adding rows to a least squares system;

FIG. 8B illustrates an example MATLAB implementation for adding rows;

FIG. 9A illustrates example mathematical operations for deleting rows from a least squares system;

FIG. 9B illustrates an example MATLAB implementation for deleting rows;

FIG. 10A illustrates example mathematical operations for adding columns to a least squares system;

FIG. 10B illustrates an example MATLAB implementation for adding columns;

FIG. 11A illustrates example mathematical operations for deleting columns from a least squares system;

FIG. 11B illustrates an example MATLAB implementation for deleting columns;

FIG. 12 illustrates another example MATLAB implementation for deleting columns;

FIG. 13 illustrates an example MATLAB implementation for element change;

FIG. 17 illustrates an example MATLAB implementation for testing relative errors of the disclosed methods;

FIG. 18 illustrates an example MATLAB implementation for testing numerical stability of the disclosed system;

DETAILED DESCRIPTION

Figure 14:
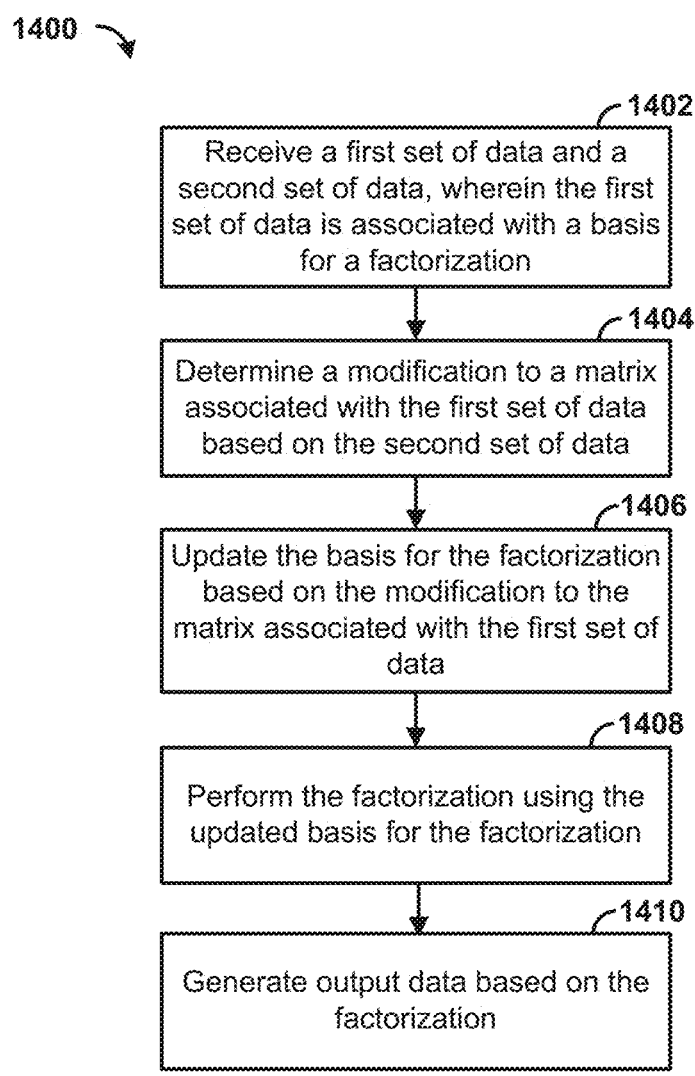
FIG. 14 is a flowchart illustrating another example method for solving a data set.

Before the present methods and systems are disclosed and described, it is to be understood that the methods and systems are not limited to specific methods, specific components, or to particular configurations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to computer implemented methods and systems for data management, data analysis, and processing. The disclosed methods and systems can improve computational efficiency when solving problems, including problems that use least squares, such as multiple linear regression problems. In an aspect, intermediate data can be reused, and thus increase computational speed and numerical stability. The disclosed methods can improve computational efficiency in solving a problem for a second or further time when an operation is applied to data, such as adding, removing, and/or modifying data. As an example, the operation applied to the data can be represented by addition, modification, deletion, and/or the like of one or more rows and/or columns of a matrix associated with the data. The disclosed methods and systems can enable an efficient method for solving a system of equations.

A typical environment for the systems and methods described herein is for assisting in a computer implemented method for building and updating a multi-dimensional cube data structure, such as, e.g., the systems and methods described in U.S. Pat. No. 7,058,621, which is incorporated by reference in its entirety.

In an aspect, the systems and methods described herein can be used in visualizing data and/or statistics. For example, a user can cause a graph to be generated visualize the relationships of several data types, such as, for example, a product, a year, and a region. In an aspect, one or more of the data types can be updated with new data. In another aspect, one or more of the data types can be removed from consideration. In yet another aspect, one or more additional data types can be added for consideration. The systems and methods described herein can be used to update the graph as changes to data and/or data types considered are made.

In an aspect, the systems and methods described herein can be used with applications associated with streaming data. For example, the systems and methods described herein can be used for outlier filtering with streaming data and/or data profiling with streaming data. In an aspect, the systems and methods described herein can be used with applications associated with pattern recognition. For example, the systems and methods described herein can be used for clustering data. In an aspect, the systems and methods described herein can be used for applications that collect and/or analyze a relatively large amount of data and identify a relatively few amount of parameters. For example, the systems and methods described herein can be used for parameter estimation and/or system recognition. In an aspect, the systems and methods described herein can be used with applications associated with system optimization. In an aspect, the systems and methods described herein can be used with applications associated with analysis of dynamic systems.

In an aspect, the systems and methods described herein can be used with simulations, such as simulations within the field of physics. In an aspect, the systems and methods described herein can be used with mathematical models, such as deterministic and/or stochastic models. In a further aspect, the systems and methods described herein can be used in applications to model any dynamic system, such as banks, financial systems, populations, traffic, and the like. The systems and methods described herein can be used with data analysis, such as data associativity and data reading.

Systems and methods are provided for improving computational efficiency when solving statistical problems, e.g., multiple linear regression problems, or other problems wherein data can be represented in the form of a system of equations Ax=b, wherein A is a matrix and x and b are column vectors. These types of problems may be encountered, e.g., when having the need to continuously update control parameters.

Systems and methods are provided for improving computational efficiency when solving such statistical problems for a second or further time when additional data is being made available. The additional data can be provided as, or being equivalent to, addition or deletion of rows and columns to or from the matrix A. In certain cases additional data may constitute change of certain elements in the matrix A.

Systems and methods are provided for executing an initial solution by:
a) taking matrix A and make QR factorization of matrix A using a Householder reflection algorithm producing intermediate results, the intermediate results including a number of dot products (scalar products). The scalar products being calculated as first column of matrix A dot multiplied with first column of matrix A;
b) saving the intermediate results, particularly the dot products;
c) calculating the basis for the factorization G1 using the saved intermediate results;
d) doing the factorization (of the basis);
e) calculating Q and Q transpose; and
f) solving equation system using Q transpose and back propagation method.

Systems and methods are provided for executing a subsequent solution by:
a) updating matrix A;
b) updating the intermediate results and saving the updated intermediate results;
c) calculating the basis for the factorization G1 using the saved updated intermediate results;
d) doing the factorization (of the basis);
e) calculating Q and Q transpose; and
f) solving equation system using Q transpose and back propagation method.

FIG. 1 is a block diagram of an example system 100 configured to solve a data set. In one aspect, the system 100 can comprise a first device 102, a second device 104, a third device 106, and/or additional devices. The first device 102, the second device 104, and/or the third device 106 can be communicatively coupled with each other and/or additional devices through a network 108. In one aspect, the network 108 can comprise a packet switched network (e.g., internet protocol based network), a non-packet switched network (e.g., quadrature amplitude modulation based network), and/or the like. The network 108 can comprise network adapters, switches, routers, modems, and the like, connected through wireless links (e.g., radio frequency, satellite) and/or physical links (e.g., fiber optic cable, coaxial cable, Ethernet cable, or a combination thereof). In one aspect, the network 108 can be configured to provide communication from a telephone, a modem, and/or other electronic devices to and throughout the system 100.

In one aspect, the first device 102 can be configured to process data. For example, the first device 102 can be configured to receive requests for data, requests to process data, communications data, and/or the like. For example, the first device 102 can be a server configured to enable access to and/or manipulation of data. For example, the first device 102 can be a client configured to render manipulated and aggregated data from a server, such as the second device 104 configured as a data server. In this context, data manipulating computations performed over large datasets can be demanding for data servers and devices manipulating data. Therefore, deltas (e.g., changes) of data can be processed by the first device 102. These deltas of data can be comparatively small amounts of data to be removed or included in computations. According to the teachings of this disclosure, the present methods and systems can improve computation time and improve scalability of systems determining solutions based on the deltas through the use of intermediate data rather than recomputing an entire new solution.

In one aspect, the first device 102 can comprise a solution unit 103. The solution unit 103 can be configured to solve a data set, such as one or more equations, and/or a matrix representation thereof. In an aspect, the solution unit 103 can be configured for receiving a first set of data, determining a first set of intermediate data based on the first set of data, and determining a basis for a factorization based on the first set of intermediate data. In an aspect, the solution unit 103 can be further configured for receiving a second set of data, updating the basis for the factorization based on the second set of data, and performing the factorization based on the updated basis for the factorization. In an aspect, the solution unit 103 can be configured for generating output data based on the factorization. In an aspect, the solution unit 103 can be configured to present the output data in a variety of forms such as graphs, figures, tables, and the like.

In an aspect, the solution unit 103 can be configured for receiving a first set of data and a second set of data. The first set of data can be associated with a basis for a factorization. The solution unit 103 can be configured to determine a modification to a matrix associated with the first set of data based on the second set of data and update the basis for the factorization based on the modification to the matrix associated with the first set of data. The solution unit 103 can be configured to perform the factorization using the updated basis for the factorization and generate output data based on the factorization.

In one aspect, the first device 102 can comprise an interface unit 105. As an example, the interface unit 105 can access and/or capture data from a plurality of user devices, databases, dashboards, analytics, and the like. The interface unit 105 can consolidate data from multiple sources into a single application and enable output calculation through real-time collaboration from the multiple sources. In an aspect, the interface unit 105 can receive a request (e.g., search request, problem solving request, etc.) from one or more users and/or user devices.

In one aspect, the second device 104 can comprise a storage unit 107. In an aspect, the storage unit 107 can be configured for storing data, such as intermediate data 109 and operational data 111. As an example, the intermediate data 109 can comprise a first set of intermediate data, a second set of intermediate data, and/or the like. In one aspect, intermediate data can comprise one or more scalar products, data products, and/or the like. The intermediate data can be calculated based on one or more equations and/or a matrix representation thereof. As a specific example, a first set of intermediate data can comprise a basis for a factorization (e.g., QR factorization) for one or more equations. A second set of intermediate data can be associated with the first set of intermediate data (e.g., update of the first set of data). In an aspect, the operational data 111 can comprise any data associated with one or more operations to solve a problem or describe a system. For example, the operational data 111 can comprise data associated with a user, such as business data, account data, management data, product data, sales data, and/or the like.

In an aspect, the system 10 can comprise a third device 106. The third device 106 can be a user device. The third device 106 can be configured to provide content, services, information, applications, and/or the like to one or more users. For example, the third device 106 can comprise a computer, a smart device (e.g., smart phone, smart watch, smart glasses, smart apparel, smart accessory), a laptop, a tablet, a set top box, a display device (e.g., television, monitor), digital streaming device, proxy, gateway, transportation device (e.g., on board computer, navigation system, vehicle media center), sensor node, and/or the like.

In an aspect, the third device 106 can comprise a communication element 113. As an example, the communication element 113 can request or query various files from a local source and/or a remote source. As a further example, the communication element 113 can transmit data to and/or receive data from a local and/or a remote device, such as the first device 102. The communication element 113 can comprise hardware and/or software to facilitate communication. For example, the communication element 113 can comprise one or more of a modem, transceiver (e.g., wireless transceiver), digital-to-analog converter, analog-to-digital converter, encoder, decoder, modulator, demodulator, tuner (e.g., QAM tuner, QPSK tuner), and/or the like. In one aspect, the communication element 113 can be configured to allow one or more remote devices (e.g., in a local or remote portion of the network 108) to control operation of the third device 106.

In one aspect, the third device 106 can comprise an interface element 115 configured to provide an interface to a user to interact with the third device 106 and/or remote devices, such as the first device 102. The interface element 115 can be any interface for presenting and/or receiving information to/from the user, such as user feedback. An example interface can comprise a content viewer, such as a web browser (e.g., Internet Explorer®, Mozilla Firefox®, Google Chrome®, Safari®, or the like), media player, application (e.g., web application, and/or the like.) Other software, hardware, and/or interfaces can be used to provide communication between the user and one or more of the third device 106 and the first device 102.

FIG. 2 is a flowchart illustrating an example method. At step 202, a first set of data can be received. In an aspect, the first set of data can comprise data associated with a system of one or more equations. As an example, the first set of data can be input data related to solving a problem (e.g., a multiple linear regression problem). As an example, the first set of data can represent a system of one or more equations, such as Ax=b, wherein A can be a matrix and x and b can be column vectors. For example, the data can comprise direct values of the matrix problem as a numbered set, or a set of mathematical expressions that describe how to compute the columns of the matrix out of a reference data set, such as a data set in storage unit 107.

At step 204, a first set of intermediate data based on the first set of data can be determined. The first set of intermediate data can comprise data determined as part of one or more calculations. For example, the first set of intermediate data can comprise the product of the transposed matrix multiplied by the original matrix. As a further example, the intermediate data can comprise data determined in intermediate steps in factorizations to be updated at a later time, such as iterations of the Householder reflection under QR factorization of the matrix A. In an aspect, the first set of intermediate data can comprise a plurality of scalar products. As an example, the plurality of scalar products can comprise the dot product of the first column of a matrix associated with the first set of data (e.g., matrix A) and the first column of the matrix associated with the first set of data (e.g., matrix A). In an aspect, a standard solution to least square problems can involve using the QR Factorization A=QR, wherein Q can be an orthogonal matrix and R can be an upper triangular, which can indicate $Ax=\overline{b} \Leftrightarrow QRx=\overline{b} \Leftrightarrow Rx=Q^T\overline{b}$.

In an aspect, the first set of intermediate data can be determined based on one or more of a Householder reflection algorithm, a Givens rotations algorithm, and a Graham Schmidt algorithm. As an example, the house holder reflection algorithm can be used to process an n×m matrix A, wherein A can be written as:

$$A = \begin{bmatrix} a_{1,1} & a_{1,2} & a_{1,3} & \cdots & a_{1,m} \\ a_{2,1} & a_{2,2} & a_{2,3} & \cdots & a_{2,m} \\ a_{3,1} & a_{3,2} & a_{3,3} & \cdots & a_{3,m} \\ \vdots & \vdots & \vdots & \ddots & \vdots \\ a_{n,1} & a_{n,2} & a_{n,3} & \cdots & a_{n,m} \end{bmatrix}$$

With each iteration i of the algorithm, a matrix $H_i$, can be created. After m iterations, $R=H_m \ldots H_1 A$ and $Q^T\overline{b}=H_m \ldots H_1\overline{b}$, which can be used to solve $Rx=Q^T b$. To construct $H_i$, let $\bar{u}_i$ be the i column excluding the first i−1 elements of $H_{i-1} \ldots H_1 A$ that can be $\bar{u}_i = (H_{i-1} \ldots H_1 A)[i:n,i]$. Let $$w_i = -\frac{u_i[1]}{|\bar{u}_i[1]|}|\bar{u}_i|,$$

the Euclidian distance of $\bar{u}_i$ with opposite sign of $\bar{u}_i[1]$ and $\bar{v}_i = \bar{w}_i - \bar{u}_i$, wherein $$\bar{w}_i = \begin{bmatrix} w_i \\ 0 \\ \vdots \\ 0 \end{bmatrix}.$$

In an aspect, the sign of $w_i$ can be chosen to be opposite to the first element in $\bar{u}_i$ to prevent possible loss of accuracy in case $w_i \approx \bar{u}_i[1]$, then $$H_i = I - 2\frac{\bar{v}\bar{v}^T}{\bar{v}^T\bar{v}}.$$

In an aspect, $H_1 A$ and $H_1 \bar{b}$ can be calculated. Here, $$\bar{v}_1 = \begin{bmatrix} w_1 - a_{1,1} \\ a_{2,1} \\ \vdots \\ a_{n,1} \end{bmatrix}, \quad w_1 = \pm\sqrt{\sum_{1}^{n} a_{i,1}^2}$$

The first iteration can create $H_1 A$ and $H_1 \bar{b}$. A projection matrix P can be constructed by the matrix $\bar{v}\bar{v}^T$ where each element can be divided by the scalar $\bar{v}^T\bar{v}$. These elements can be defined as follows:

$$\bar{v}^T\bar{v} = 2w_1(w_1 - a_{1,1})$$

$$\bar{v}\bar{v}^T = \begin{bmatrix} (w_1 - a_{11})^2 & -a_{21}(w_1 - a_{11}) & \cdots & -a_{n1}(w_1 - a_{11}) \\ -a_{21}(w_1 - a_{11}) & a_{21}^2 & \cdots & a_{21}a_{n1} \\ \vdots & \vdots & \ddots & \vdots \\ -a_{n1}(w_1 - a_{11}) & a_{n1}a_{21} & \cdots & a_{n1}^2 \end{bmatrix}$$

As $H_1 = I - 2P$, each element of the matrix $H_1$, $H_1 A$ and $H_1 \bar{b}$ can be determined individually using elements in A and $w_1$. FIG. 3A illustrates mathematical operations of one or more elements of $H_1 A$ and FIG. 3B illustrates mathematical operations of one or more elements of $H_1 \underline{b}$. The first iteration can generate $H_1 A$ and $H_1 \underline{b}$. The first row and the first column in $H_1 A$ can be made triangular which means that $H_1 A$ (2:n,2:m) can be viewed a non-triangular submatrix.

FIG. 4A illustrates mathematical operations of one or more elements of $H_2 H_1 A$ and FIG. 4B illustrates mathematical operations of one or more elements of $H_2 H_1 \underline{b}$. In an aspect, $H_2$ can be calculated by reiterating the process to calculate $H_1$ using $H_1 A$ instead of A as the basis of calculations. In an aspect, the non-triangular part of $H_1 A$, $H_1 A$ (2:n,2:m) can be used.

If A is considered in the first iteration as the initial input, the input for the second iteration would be $H_1 A$ (2:n,2:m).

This means that the output from the second iteration can be a matrix with one less row and column than $H_1$. The output from the second iteration can be called matrix $\hat{H}_2$. $\hat{H}_2$ can have a static relationship to $H_2$. $H_2$ can be written as:

$$H_2 = \begin{bmatrix} 1 & 0 & \cdots & 0 \\ 0 & & & \\ \vdots & & \hat{H}_2 & \\ 0 & & & \end{bmatrix}$$

Just as calculated $H_1$, every element in $\hat{H}_2$ can be expressed using the elements in the input matrix, in this case $H_1 A$ (2:n,2:m) and $w_i$. For example, $w_2$ can be calculated as follows.

$$w_2 = \sqrt{\sum_{i=2}^{n} H_1 A(i,1)^2}$$

The second row of $H_2 H_1 A$ can depend on the dot products between the second column and all columns to its right in A as well as the dot products between the first column and all other columns in A. All dot products can be calculated at this point.

In an aspect, provided in FIG. 5A, are example mathematical operations for calculating $H_k \ldots H_1 A$. In an aspect, provided in FIG. 5B, are example mathematical operations for calculating $H_k \ldots H_1 \bar{b}$. In order to arrive at a point to have structures required to solve the system of equations associated with the first set of data, m iterations can be performed, that is, as many iterations as A has columns. With each iteration, $H_k \ldots H_1 A$ can move towards its final triangular state by making one row and one column triangular per iteration. Similarly, $H_k \ldots H_1 \bar{b}$ can gain one correct element per iteration before arriving at its final state (e.g., after the last iteration) in which every element can be correct. In short, iteration k cannot change the first k−1 rows in neither $H_k \ldots H_1 A$ nor $H_k \ldots H_1 \bar{b}$, and can render the $k^{th}$ row correct in both $H_k \ldots H_1 A$ and $H_2 \ldots H_1 \underline{b}$.

The dot products between all the columns in A can be used. The $k^{th}$ row in $H_k \ldots H_1 A$ can be calculated from the dot products of the $k^{th}$ column and all the columns to its right in A during the $k^{th}$ iteration. When k=m, $Q^T \bar{b} = H_m \ldots H_1 \underline{b}$ and $R = H_m \ldots H_1 A$. The system can be solved using the equation $Rx = Q^T \bar{b}$ and a back substitution algorithm, or other relevant algorithm.

It can be seen in $H_k \ldots H_1 A$ and $H_k \ldots H_1 \underline{b}$, each row can be divided by $w_k$ in both matrices. This property may not affect the equality, and, therefore, may not affect the solution to the system. However, $w_i$ can affect the numerical properties of back substitution.

At step 206, a basis for a factorization can be determined based on the first set of intermediate data. As an example, the Householder algorithm can be expressed as matrix-vector operations. When matrices with different dimensions need to be added or subtracted, a smaller matrix can be padded with zeros on the upper and left side until the dimensions of both matrices agree. The mathematical operations for calculating a basis for a factorization are illustrated in FIG. 6.

In an aspect, operations in FIG. 6 can comprise two parts: calculation of a basis for a factorization, $G_1$, and factorization of the basis. In an aspect, calculating dot products (e.g., a computationally intensive calculation) can take place during a first part (e.g., calculating the basis for factorization). In an aspect, the basis for factorization $G_1$ can be stored and updated when one or more modification (e.g., adding rows, deleting row, etc.) is made to a matrix (e.g., matrix A) associated with the first set of data. As such, the disclosed methods can bypass calculation of the first set of intermediate data (e.g., the dot products) from scratch, thereby reducing the amount of computations required to solve a system of equations related to the system of equations associated with the first set of data. In an aspect, the basis for the factorization can be stored. The basis for the factorization can be retrieved to facilitate further calculation. An example MATLAB implementation to calculate a basis for factorization and to perform factorization is illustrated in FIG. 7.

At step 208, output data can be generated based at least in part on the first set of data. In an aspect, the output data can represent a model and/or a simulation of the first set of data. In an aspect, the output data can represent a solution to a problem (e.g., a multiple linear regression problem).

At step 210, a second set of data can be received. In an aspect, the second set of data can be associated with a system of one or more equations related to the system of one or more equations associated with the first set of data. In an aspect, the second set of data can comprise updated data for the first set of data. As an example, the second set of data can be related to solving a problem (e.g., a multiple linear regression problem). As an example, the second set of data can comprise a set of input data for the system or equation $A_2 x = b_2$, wherein $A_2$ can be a matrix and x and $b_2$ can be column vectors. In an aspect, matrix $A_2$ and column vector $b_2$ associated with the second set of data can be different from the matrix A and column vector b associated with the first set of data.

At step 212, the basis for the factorization can be updated based on the second set of data. The difference between the first set of data and the second set of data, which is described as additions or removals of data elements in a minimal form, is the so called delta of data. This delta of data can be used for updating the intermediate data set while avoiding recomputation of the intermediate set as in step 204. This process is particularly simple if the relations of the intermediate data and the dataset are linear, as for instance dot products of matrix columns. In an aspect, updating the basis for the factorization can comprise determining a second set of intermediate data based on the second set of data.

In an aspect, the second set of intermediate data can comprise a plurality of scalar products based on the first set of intermediate data. As an example, the second set of intermediate data can be generated by adding a plurality of scalar products from the first set of intermediate data and/or removing a plurality of scalar products from the first set of intermediate data.

In an aspect, updating the basis for the factorization can comprise at least one of adding one or more rows to a matrix (e.g., matrix A) associated with the first set of data, adding one or more columns to the matrix associated with the first set of data, removing one or more rows from the matrix associated with the first set of data, removing one or more columns from the matrix associated with the first set of data, changing one or more elements of the matrix associated with the first set of data, and/or the like.

As an example, a prepare-function can complete $$nm^2 + 3nm - m^2 - \frac{3m}{2} \Rightarrow O(nm^2)$$

operations, factor can complete in $$\frac{m^3}{3} + \frac{m^2}{2} + \frac{m}{6} \Rightarrow O(m^3),$$

a complete solution can have the complexity $O(nm^2+m^3)$, where n is the number of rows and m is the number of columns. The prepare function can determine the precomputation of the base for later factorization. For example, the prepare-function can comprise the computation of dot products of the columns of matrix A.

As an example, adding another p row can translate to add the dot products of the new points to the existing dot products. This can imply that the dot products of a previous solution associated with the first set of data, $G_1$ and $T_1$ can be used. Adding another p rows to the system can require $$pm^2 + 3pm - \frac{m^2}{2} \Rightarrow O(pm^2)$$

additional computations. This function can replace the prepare-function and the rest of the solve-function still requires $O(m^3)$ calculations. Mathematical operations of adding rows to a least squares system are illustrated in FIG. 8A. An example MATLAB implementation of adding rows is illustrated in FIG. 3B.

As another example, deleting rows can be the same as adding rows, except that the dot products can be subtracted from $G_1$ associated with the first set of data. Mathematical operations of deleting rows from a least squares system are illustrated in FIG. 9A. An example MATLAB implementation of deleting rows is illustrated in FIG. 9B.

As another example, adding another p columns to the n×m matrix A can require $pm+p^2$ new dot products, but no previous dot product needs to be updated. The time complexity of this calculation can be $O(np(m+p))$ compared to the prepare function $O(n(m+p)^2)$. Mathematical operations of adding columns to a least squares system are illustrated in FIG. 18A. An example MATLAB implementation of adding columns is illustrated in FIG. 10B.

In an aspect, deleting p columns can be simply a matter of removing all dot products related to any of the deleted columns. More specifically, deleting the $k^{th}$ column can be accomplished by removing the $k^{th}$ column and the $k^{th}$ row in $G_0$. This operation can depend on the implementation of the matrix but the worst case can be $O((m-k)^2)$ operations since every column to the right, and every row below can be realigned. Factorization can be another $O((m-p)^3)$ operations. Mathematical operations of deleting columns from a least squares system are illustrated in FIG. 11A. An example MATLAB implementation of deleting columns is illustrated in FIG. 11B.

Another operation can be to remove the $k^{th}$ column and row from R and recalculating the elements below the 0 row, as shown in FIG. 12. This operation requires $O(m^2+(m-k-p)^3)$ with k being the index of the leftmost deleted column.

As another example, elements can be changed in matrix A. If a few elements in A are changed, the dot products can be recalculated. Each dot product with a changed column can be added to a difference $(a_{i,j} - \hat{a}_{i,j}) a_{i,k}$, wherein i is the column with a changed element. This change can require $O(pm)$ calculations for p changed elements. In an aspect, a MATLAB implementation for element change is illustrated in FIG. 13.

In an aspect, sparsity in A can be considered in the calculation of each dot product. For example adding a row with only one element would only require recalculation of the dot product with that column and itself.

In an aspect, adding a diagonal block to A, $$\hat{A} = \begin{bmatrix} & & & 0 & \cdots & 0 \\ & A & & \vdots & \vdots & \vdots \\ & & & 0 & \cdots & 0 \\ 0 & \cdots & 0 & & & \\ \vdots & \vdots & \vdots & & C & \\ 0 & \cdots & 0 & & & \end{bmatrix}$$

would not require the previous dot product to be recalculated, however the dot products with the new columns would have to be calculated. For example, let C be a q×p matrix, the number of operations to compute the dot products would be $O(qp^2)$.

In an aspect, the disclosed methods can depend on the dot products of all the columns in A, a very large representation of floating point numbers can be required. The dot product of any two columns, k and l, in A can be limited by $|\bar{a}_{*,k}^T \bar{a}_{*,l}| \leq \|A\|^2$. In an aspect, $|v^T u| \leq \|v\| \cdot \|u\|$ for any vectors v and u. Furthermore, $\bar{a}_{*,k} = A\bar{e}_k$ where $\bar{a}_{*,k}$ is the $k^{th}$ column of A and $e_k$ is the $k^{th}$ unit vector. This can imply the inequality $\|\bar{a}_{*,k}\| \leq \|A\| \cdot \|\bar{e}_k\|$ with $\|\bar{e}_k\|$ which yields $\|\bar{a}_{*,k}\| \cdot \|\bar{a}_{*,l}\| \leq \|A\|^2$ for any columns k and l. The limitation might only become a problem if $\|A\|^2$ is larger than the maximum floating point value.

At step 214, the factorization can be performed based on the updated basis for the factorization. In an aspect, performing the factorization can comprise determining one or more of an orthogonal matrix Q associated with the second set of data, a transpose of the orthogonal matrix $Q^T$ associated with the second set of data, and an upper triangular matrix R associated with the second set of data. As an example, a linear system Ax=b can be written as QR Factorization A=QR, wherein Q is an orthogonal matrix and R is upper triangular. When Ax=b and QRx=$\bar{b}$, Rx=$Q^T$b The factorization can be performed using Householder reflection algorithm, and/or the like. Householder reflection can be performed along a given reflection vector. The reflection vector can be chosen in one or more (or every) iteration so that specific components of the resultant matrix are zero. After a number of iterations, the resultant matrix is R and the produced vector of the Householder algorithm is in fact $Q^T$b. Finally, the system Rx=$Q^T$b can be solved with the produced matrix and vector. As an example, $O((m-p)^3)$ operations can be required to perform the factorization.

Optionally, output data can be generated based on the factorization. In an aspect, the output data can be generated based on one or more of the orthogonal matrix associated with the second set of data, the transpose of the orthogonal matrix associated with the second set of data, and the upper triangular matrix associated with the second set of data based on a back substitution method. The output data can be generated by solving Rx=$Q^T\bar{b}$. The second set of data can comprise deltas (e.g., changes) of data. Processing the delta can comprise updating a base of factorization by the use of one or more equations, such as the equations show in FIG. 5A, FIG. 9A, FIG. 10A, or FIG. 11A. After the update, a new QR factorization is produced and new output data can be generated by solving a system Rx=$Q^T$b with updated matrices R and Q.

At step 216, the output data can be updated based at least in part on the second set of data. In an aspect, the output data can represent a model and/or a simulation of the second set of data. In an aspect, the output data can represent a solution to a problem (e.g., a multiple linear regression problem).

FIG. 14 is a flowchart illustrating another example method for solving a data set. At step 1402, a first set of data and a second set of data can be received. As an example, the first set of data can comprise a set of input data associated with a system of one of more equations. As an example, the one or more equations can be used to solve a problem (e.g., a multiple linear regression problem). As an example, the first set of data can represent a system or one or more equations such as Ax=b, wherein A can be a matrix and x and b can be column vectors.

In an aspect, the second set of data can be associated with a system of one or more equations related to the system of one or more equations associated with the first set of data. In an aspect, the second set of data can comprise updated input data for the first set of data. As an example, the second set of data can be related to solving a problem (e.g., a multiple linear regression problem). As an example, the second set of data can comprise input data for a system or equation $A_2 x = b_2$, wherein $A_2$ can be a matrix and x and $b_2$ can be column vectors. In an aspect, matrix $A_2$ and column vector $b_2$ associated with the second set of data can be different from the matrix A and column vector b associated with the first set of data.

The first set of data can be associated with a basis for a factorization. In an aspect, a basis for a factorization can be determined based on the first set of intermediate data. In an aspect, the mathematical operation of calculating basis for factorization can be expressed as matrix-vector operations. As an example, matrix-vector operations for calculating the basis for a factorization are illustrated in FIG. 6.

At step 1404, a modification to a matrix associated with the first set of data can be determined based on the second set of data. In an aspect, the modification to the matrix associated with the first set of data can comprise at least one of adding one or more rows to the matrix associated with the first set of data (e.g., matrix A), adding one or more columns to the matrix associated with the first set of data, removing one or more rows from the matrix associated with the first set of data, removing one or more columns from the matrix associated with the first set of data, changing one or more elements of the matrix associated with the first set of data, and/or the like.

At step 1406, the basis for the factorization can be updated based on the modification to the matrix associated with the first set of data. In an aspect, the basis for the factorization can be stored. In an aspect, the basis for the factorization can be determined based on one or more of a Householder reflection algorithm, a Givens rotations algorithm, and a Graham Schmidt algorithm. In an aspect, the basis for factorization can be determined based on a first set of intermediate data associated with the first set of data. In an aspect, the first set of intermediate data can comprise a plurality of scalar products. As an example, the plurality of scalar products can comprise the dot product of the first column of a matrix associated with the first set of data (e.g., matrix A) and the first column of the matrix associated with the first set of data (e.g., matrix A). In an aspect, updating the basis for the factorization can comprise determining a second set of intermediate data based on the second set of data. In an aspect, the second set of intermediate data can comprise a plurality of scalar products based on the first set of intermediate data. As an example, the second set of intermediate data can be generated by adding a plurality of scalar products from the first set of intermediate data and/or removed a plurality of scalar products from the first set of intermediate data according to the calculations at step 1404.

At step 1408, the factorization can be performed using the updated basis for the factorization. In an aspect, performing the factorization can comprise determining one or more of an orthogonal matrix Q associated with the second set of data, a transpose of the orthogonal matrix $Q^T$ associated with the second set of data, and an upper triangular matrix R associated with the second set of data. As an example, a linear system Ax=b can be written as QR Factorization A=QR, wherein Q is an orthogonal matrix and R is upper triangular. When Ax=b and QRx=$\overline{b}$, Rx=$Q^T$b. The factorization can be done with Householder reflection algorithm as in FIG. 5A. The iterative process shown in FIG. 5A describes a way of advancing from one step to the next in the QR factorization. After m steps, the determination and/or calculation of matrix R and the vector $Q^T\overline{b}$ is completed and the system Rx=$Q^T$b can be solved using standard methods, like for instance, backward substitution or iterative linear solvers, like GMRES.

At step 1410, output data can be generated based on the factorization. In an aspect, output data can be generated based on one or more of the orthogonal matrix associated with the second set of data, the transpose of the orthogonal matrix associated with the second set of data, and the upper triangular matrix associated with the second set of data. For example, the output data can be generated based on a back propagation method or other method. In an aspect, second output data can be generated based on one or more of the orthogonal matrix associated with the second set of data, the transpose of the orthogonal matrix associated with the second set of data, and the upper triangular matrix associated with the second set of data (e.g., based on a back substitution or other method). The output data can be generated by solving Rx=$Q^T$b. The second set of data can be used to determine an update of the basis for factorization. After the update is determined and applied, a new factorization can be computed iteratively and this factorization can produce an updated system Rx=$Q^T$b. The new solution of the latter updated system can comprise the second output data.

Figure 15:
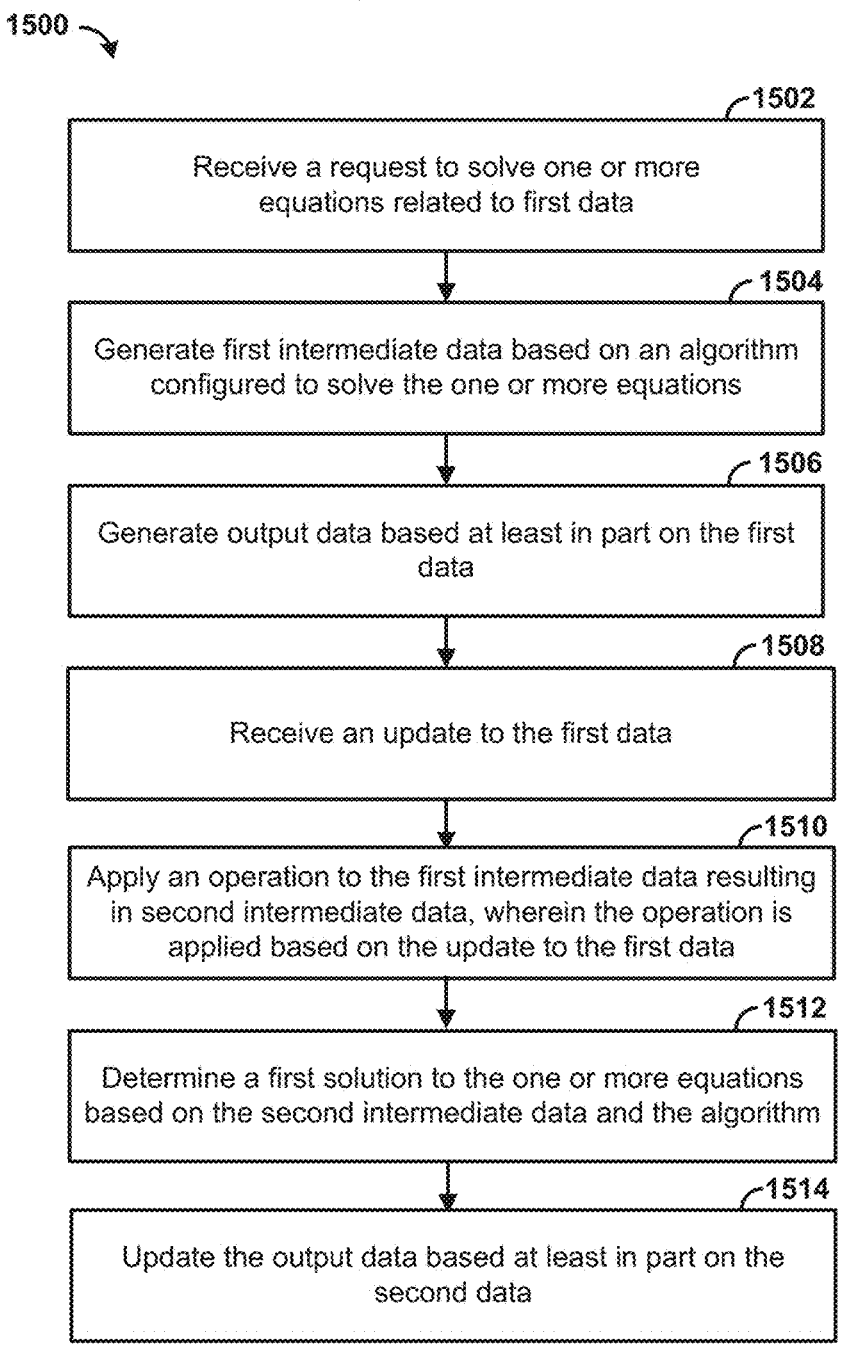
FIG. 15 is a flowchart illustrating another example method for solving a data set.

FIG. 15 is a flowchart illustrating another example method for solving a data set. At step 1502, a request to solve one or more equations related to first data can be received. As an example, the one or more equations can be used to solve a problem (e.g., a multiple linear regression problem). As an example, the one or more equations can comprise Ax=b, wherein A can be a matrix and x and b can be column vectors. In an aspect, the first data can comprise input data to the one or more equations.

At step 1504, first intermediate data can be generated based on an algorithm configured to solve the one or more equations. The first intermediate data can be an intensive part of solving one or more equations and can be retrieved for later use when updated first data (e.g., input data) becomes available. In an aspect, the first intermediate data can comprise a plurality of scalar products. The plurality of scalar products can be the result of a dot product of the first column of a matrix associated with the one or more equations (e.g., matrix A) and the first column of the matrix associated with the one or more equations (e.g., matrix A).

In an aspect, a linear system Ax=b can be written as QR Factorization A=QR, wherein Q can be an orthogonal matrix and R can be an upper triangular, which can give QRx=$\overline{b}$. In this scenario, the first intermediate data can be related to a portion of factorization calculation. For example, the first intermediate data can be related to basis for the factorization. In an aspect, the algorithm can comprise a Householder reflection algorithm, a Givens rotations algorithm, and a Graham Schmidt algorithm, a back substitution algorithm, or any other algorithms suitable for solving the one or more equations.

At step 1506, output data can be generated based at least in part on the first set of data. In an aspect, the output data can represent a model and/or a simulation of the first set of data. In an aspect, the output data can represent a solution to a problem (e.g., a multiple linear regression problem).

At step 1508, an update to the first data can be received. For example, an update to the first data can comprise additional input data and/or updated first data to the one or more equations associated with the first data. As an example, the one or more equations can be updated upon receiving the updated to the first data. For example, the equation Ax=b can be updated, wherein A can be an updated matrix and x and b can be updated column vectors.

At step 1510, an operation can be applied to the first intermediate data resulting in second intermediate data. In an aspect, the second set of intermediate data can comprise a plurality of scalar products based on the first set of intermediate data. As an example, the second set of intermediate data can be generated by adding a plurality of scalar products from the first set of intermediate data and/or removed a plurality of scalar products from the first set of intermediate data.

In an aspect, the operation can be applied based on the update to the first data. For example, the operation can comprise at least one of adding one or more rows to a matrix associated with the one or more equations (e.g., matrix A), adding one or more columns to the matrix associated with the one or more equations, removing one or more rows from the matrix associated with the one or more equations, removing one or more columns from the matrix associated with the one or more equations, changing one or more elements of the matrix associated with the one or more equations.

At step 1512, a first solution to the one or more equations can be determined based on the second intermediate data and the algorithm. For example, a factorization of updated matrix A can be performed based on the second intermediate data. In an aspect, performing the factorization can comprise determining one or more of an orthogonal matrix Q associated with the update to the first data, a transpose of the orthogonal matrix $Q^T$ associated with the update to the first data, and an upper triangular matrix R associated with the update to the first data. As an example, a linear system Ax=b can be written as QR Factorization A=QR, wherein Q is an orthogonal matrix and R is upper triangular. When Ax=b and QRx=$\overline{b}$, then Rx=$Q^T$b. In an aspect, the algorithm configured to solve the one or more equations can comprise a Householder reflection algorithm, a Givens rotations algorithm, and a Graham Schmidt algorithm, a back substitution algorithm, or any other algorithms suitable for solving Rx=$Q^T$b.

In an aspect, specific characteristics of the disclosed methods can be tested by randomly generated inputs to avoid biased test results. Steps of testing relative error can comprise:

Step 1—Generate random A with condition number k≤10;
Step 2—Generate random x with $\|x\|$=1;
Step 3—Compute b=Ax;
Step 4—Solve A$\hat{x}$=b for $\hat{x}$;
Step 5—Compute δb=A$\hat{x}$−b; and
Step 6—Check $$\|\hat{x} - x\| \le k \frac{\|\delta b\|}{\|b\|}.$$

Figure 16:
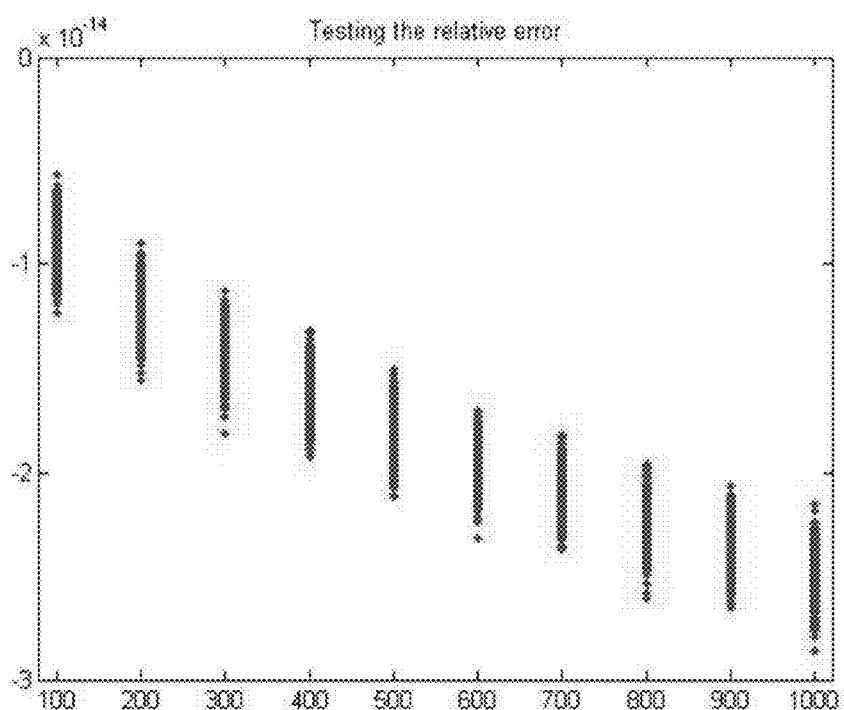
FIG. 16 illustrates results from a relative error test.

In an aspect, the test can be nm on matrices where $A \in R^{n \times n}$ and $n=[10^2 \ldots 10^3]$ in steps of $10^2$. Each size tested can have 1000 different matrices. As shown in FIG. 16, $\|\hat{x}-x\|$ can be strictly smaller than $$k \frac{\|\delta b\|}{\|b\|}.$$

FIG. 17 illustrates a MATLAB implementation for testing relative error of the disclosed methods.

Numerical stability can also be tested. To capture numerical instability in the algorithm, A can be generated with $\|A^{-1}\|=1$ and b with $\|b\|=1$, the disclosed methods can be tested by checking the constraint $\|x\| \le 1$. If $\|x\|$ becomes larger than 1, the disclosed methods can suffer from error magnification. For a given A and b, the inequality $\|x\| \le 1$ can hold even though the error is magnified. In fact, equality can be reached when b is aligned with the singular vector of A corresponding to the smallest singular value. This is not likely to occur for a single choice of A and b, but generating several b's for each A and testing with several A's can increase the chance of hitting such a b. FIG. 18 illustrates a MATLAB implementation for testing numerical error of the disclosed methods.

In an aspect, testing the numerical stability can comprise:
Step 1—Generate random A with $\|A^{-1}\| \le 1$;
Step 2—Generate random b with $\|b\|=1$;
Step 3—Solve Ax=b for x;
Step 4—Check $\|x\|=\|A^{-1} b\| \le \|A^{-1}\| \cdot \|b\| \le 1$.

Figure 19:
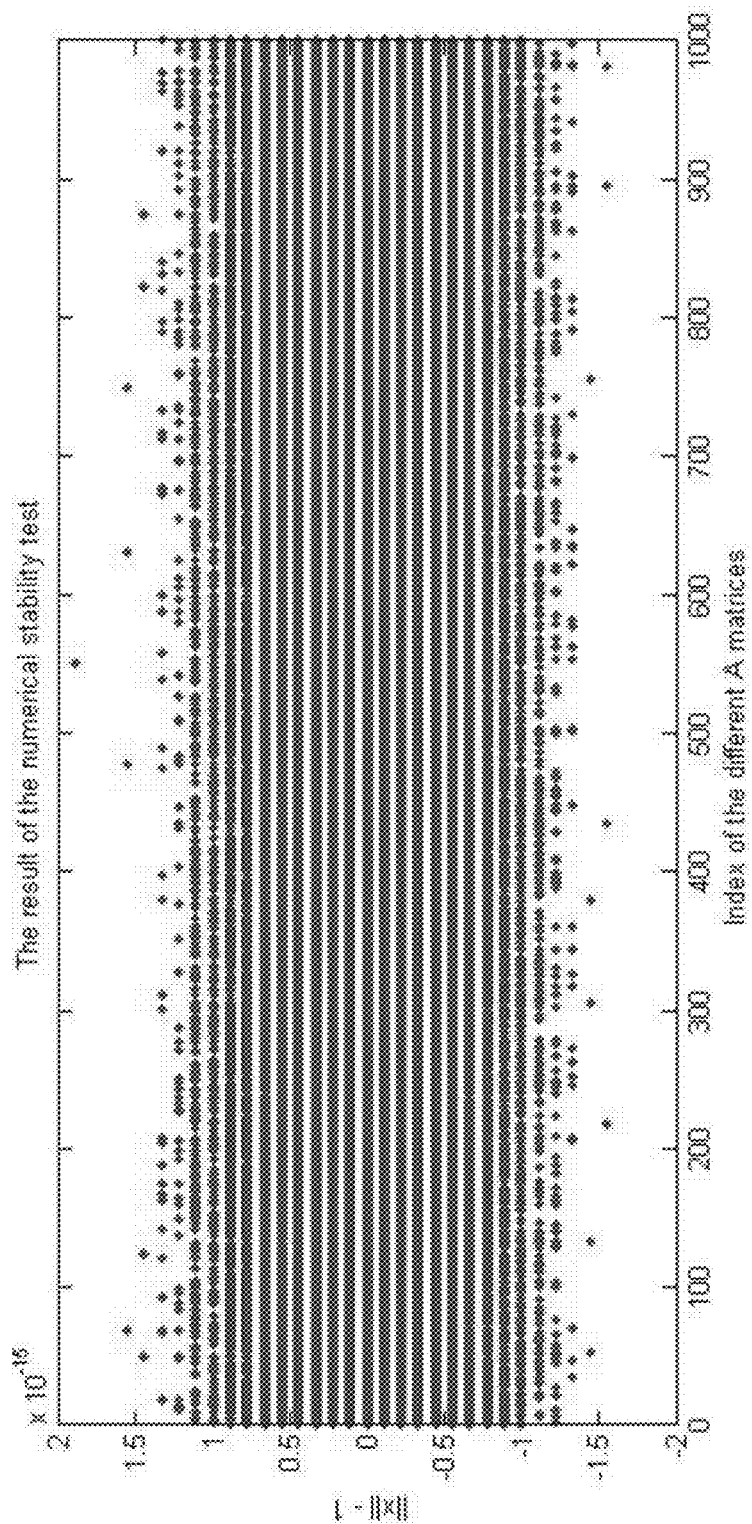
FIG. 19 illustrates results from a numerical stability test.

This test was run with 1000 different $A \in R^{100 \times 100}$. Each A tested with 1000 different b matrices and the difference $\|x\|-1$ was plotted, as shown in FIG. 19. The largest error encountered in the test was $\max_i \varepsilon_i = 17$ $\varepsilon_{much} \approx 1.89 \cdot 10^{-15} < 2 \cdot 10^{-15}$, $\varepsilon_i = |\|x_i\|-1|$. This error is within an accepted error bounds. Only 0.1567% of the errors were larger than $10^{-15}$. As shown in FIG. 19, the difference $\|x\|-1$ for each test was plotted with dots. The y-axis represents the index of the different A matrices. For each index 1000 dots are plotted, one for each b vector. $\|x\|-1=0$ implies no error. The distance from 0 is within an accepted error bounds which implies success of the disclosed methods.

At step 1514, the output data can be updated based at least in part on the second data. In an aspect, the output data can represent a model and/or a simulation of the second set of data. In an aspect, the output data can represent a solution to a problem (e.g., a multiple linear regression problem).

Figure 20:
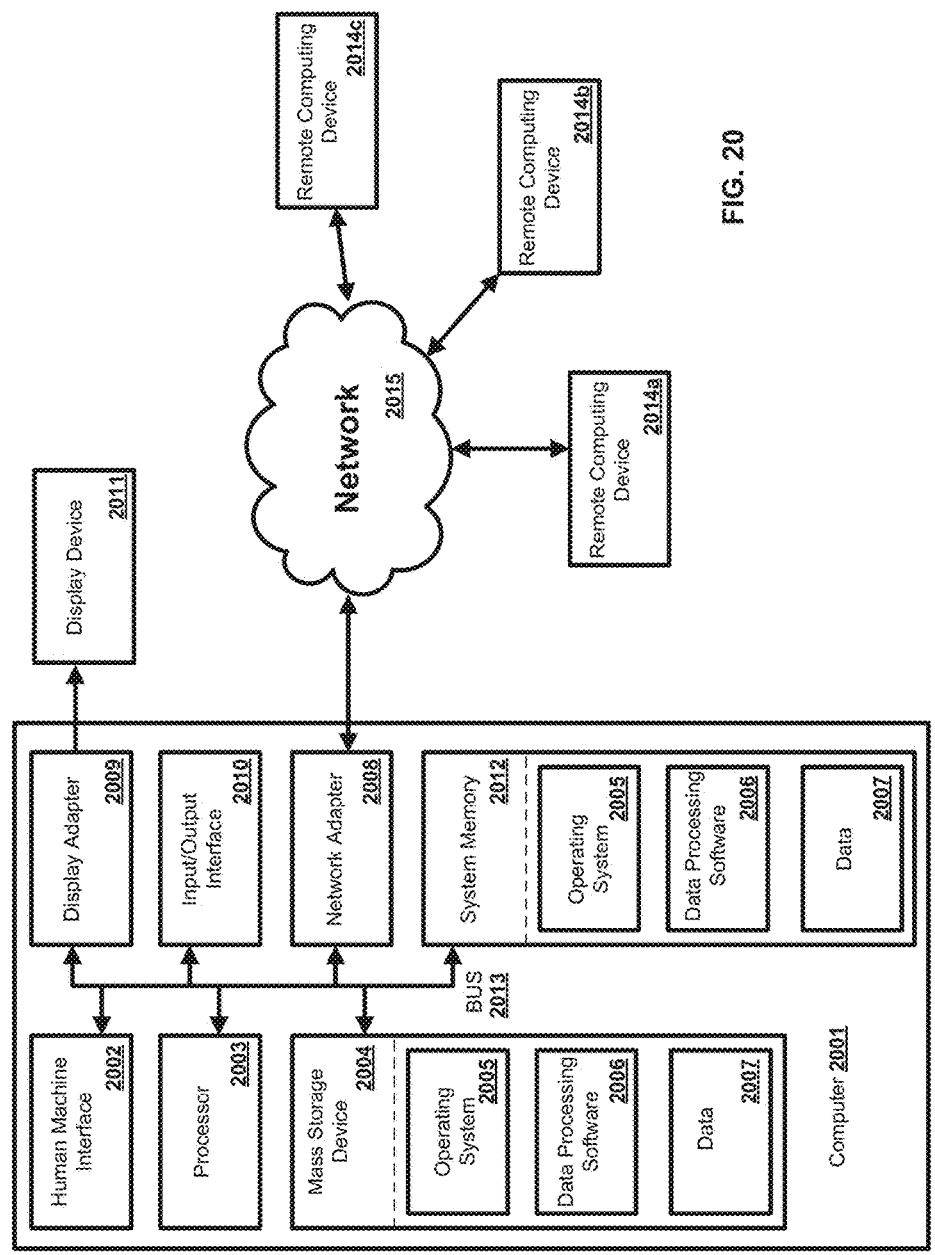
FIG. 20 is a block diagram illustrating an example computing device.

FIG. 20 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2001. By way of example, the computer 2001 can be the first device 102, the second device 104, and/or the third device 106. The components of the computer 2001 can comprise, but are not limited to, one or more processors or processing units 2003, a system memory 2012, and a system bus 2013 that couples various system components including the processor 2003 to the system memory 2012. In the case of multiple processing units 2003, the system can utilize parallel computing.

The system bus 2013 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 2013, and all buses specified in this description can also be implemented over a wired or wireless network connection and each of the subsystems, including the processor 2003, a mass storage device 2004, an operating system 2005, data processing software 2006 (e.g., equation solving software), data 2007 (e.g., intermediate data, basis data, factorization data), a network adapter 2008, system memory 2012, an Input/Output Interface 2010, a display adapter 2009, a display device 2011, and a human machine interface 2002, can be contained within one or more remote computing devices 2014$a,b,c$ at physically separate locations, connected through buses of this form, in effect implementing a fully distributed system.

The computer 2001 typically comprises a variety of computer readable media. Exemplary readable media can be any available media that is accessible by the computer 2001 and comprises, for example and not meant to be limiting, both volatile and non-volatile media, removable and non-removable media. The system memory 2012 comprises computer readable media in the form of volatile memory, such as random access memory (RAM), and/or non-volatile memory, such as read only memory (ROM). The system memory 2012 typically contains data such as data 2007 and/or program modules such as operating system 2005 and data processing software 2006 that are immediately accessible to and/or are presently operated on by the processing unit 2003.

In another aspect, the computer 2001 can also comprise other removable/non-removable, volatile/non-volatile computer storage media. By way of example, FIG. 20 illustrates a mass storage device 2004 which can provide non-volatile storage of computer code, computer readable instructions, data structures, program modules, and other data for the computer 2001. For example and not meant to be limiting, a mass storage device 2004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2004, including by way of example, an operating system 2005 and data processing software 2006. Each of the operating system 2005 and data processing software 2006 (or some combination thereof) can comprise elements of the programming and the data processing software 2006. Data 2007 can also be stored on the mass storage device 2004. Data 2007 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 2001 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 2003 via a human machine interface 2002 that is coupled to the system bus 2013, but can be connected by other interface and bus structures, such as a parallel port, game port, an IEEE 1394 Port (also known as a Firewire port), a serial port, or a universal serial bus (USB).

In yet another aspect, a display device 2011 can also be connected to the system bus 2013 via an interface, such as a display adapter 2009. It is contemplated that the computer 2001 can have more than one display adapter 2009 and the computer 2001 can have more than one display device 2011. For example, a display device can be a monitor, an LCD (Liquid Crystal Display), or a projector. In addition to the display device 2011, other output peripheral devices can comprise components such as speakers (not shown) and a printer (not shown) which can be connected to the computer 2001 via Input/Output Interface 2010. Any step and/or result of the methods can be output in any form to an output device. Such output can be any form of visual representation, including, but not limited to, textual, graphical, animation, audio, tactile, and the like.

The computer 2001 can operate in a networked environment using logical connections to one or more remote computing devices 2014*a,b,c*. By way of example, a remote computing device can be a personal computer, portable computer, a server, a router, a network computer, a peer device or other common network node, and so on. Logical connections between the computer 2001 and a remote computing device 2014*a,b,c* can be made via a local area network (LAN) and a general wide area network (WAN). Such network connections can be through a network adapter 2008. A network adapter 2008 can be implemented in both wired and wireless environments. Such networking environments are conventional and commonplace in offices, enterprise-wide computer networks, intranets, and the Internet 2015.

For purposes of illustration, application programs and other executable program components such as the operating system 2005 are illustrated herein as discrete blocks, although it is recognized that such programs and components reside at various times in different storage components of the computing device 2001, and are executed by the data processor(s) of the computer. An implementation of data processing software 2006 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving a first set of data;
   determining a first set of intermediate data based on the first set of data, wherein the first set of intermediate data comprises a first plurality of scalar products;
   determining a basis for a factorization based on the first set of intermediate data;
   generating output data based at least in part on the first set of data;
   receiving a second set of data;
   updating the basis for the factorization based on the second set of data;
   performing the factorization based on the updated basis for the factorization; and
   updating the output data based at least in part on the second set of data.

2. The method of claim 1, wherein the plurality of scalar products comprise a dot product of a first column of a matrix associated with the first set of data and a first column of a transpose of the matrix associated with the first set of data.

3. The method of claim 1, wherein the first set of intermediate data is determined based on one or more of a Householder reflection algorithm, a Givens rotations algorithm, or a Graham Schmidt algorithm.

4. The method of claim 1, wherein performing the factorization comprises determining one or more of an orthogonal matrix associated with the second set of data, a transpose of the orthogonal matrix associated with the second set of data, or an upper triangular matrix associated with the second set of data.

5. The method of claim 4, further comprising:
   generating output data based on one or more of the orthogonal matrix associated with the second set of data, the transpose of the orthogonal matrix associated with the second set of data, or the upper triangular matrix associated with the second set of data.

6. The method of claim 4, wherein updating the basis for the factorization comprises determining a second set of intermediate data based on the second set of data.

7. The method of claim 1, wherein updating the basis for the factorization comprises at least one of adding one or more rows to a matrix associated with the first set of data, adding one or more columns to the matrix associated with the first set of data, removing one or more rows from the matrix associated with the first set of data, removing one or more columns from the matrix associated with the first set of data, or changing one or more elements of the matrix associated with the first set of data.

8. The method of claim 1, wherein the basis for the factorization is stored.

9. The method of claim 1, further comprising storing the first set of intermediate products.

10. A method, comprising:
    receiving a first set of data and a second set of data, wherein the first set of data is associated with a basis for a factorization;
    determining a modification to a matrix associated with the first set of data based on the second set of data;
    loading a plurality of scalar products associated with the first set of data;
    updating the basis for the factorization based on the modification to the matrix associated with the first set of data and the loaded plurality of scalar products associated with the first set of data;
    performing the factorization using the updated basis for the factorization; and
    generating output data based on the factorization.

11. The method of claim 10, wherein the basis for the factorization is stored.

12. The method of claim 10, wherein the basis for the factorization is determined based on one or more of a Householder reflection algorithm, a Givens rotations algorithm, or a Graham Schmidt algorithm.

13. The method of claim 10, wherein performing the factorization comprises determining one or more of an orthogonal matrix associated with the second set of data, a transpose of the orthogonal matrix associated with the second set of data, and an upper triangular matrix associated with the second set of data.

14. The method of claim 13, further comprising:
    generating output data based on one or more of the orthogonal matrix associated with the second set of data, the transpose of the orthogonal matrix associated with the second set of data, and the upper triangular matrix associated with the second set of data based on a back substitution method.

15. A system comprising:
    a processor, configured for:
    receiving a first set of data and a second set of data, wherein the first set of data is associated with a basis for a factorization,
    determining a modification to a matrix associated with first set of data based on the second set of data,
    loading a plurality of scalar products associated with the first set of data;
    updating the basis for the factorization based on the modification to the matrix associated with the first set of data and the loaded plurality of scalar products associated with the first set of data;
    performing the factorization using the updated basis for the factorization, and
    generating of output data based on the factorization; and
    a storage medium, configured for:
    storing the basis for the factorization, and
    storing the matrix associated with the first set of data.

16. The system of claim 15, wherein the basis for the factorization is determined based on one or more of a Householder reflection algorithm, a Givens rotations algorithm, or a Graham Schmidt algorithm.

17. A system of claim 15, wherein performing the factorization comprises determining one or more of an orthogonal matrix associated with the second set of data, a transpose of the orthogonal matrix associated with the second set of data, or an upper triangular matrix associated with the second set of data.

18. The system of claim 17, wherein the processor is further configured for generating output data based on one or more of the orthogonal matrix associated with the second set of data, the transpose of the orthogonal matrix associated with the second set of data, or the upper triangular matrix associated with the second set of data.

19. A method, comprising
receiving a request to solve one or more equations related to first data;
generating first intermediate data based on an algorithm configured to solve the one or more equations, wherein the first intermediate data comprises a first plurality of scalar products;
generating output data based at least in part on the first data;
receiving an update to the first data;
applying an operation to the first intermediate data resulting in second intermediate data comprising a second plurality of scalar products, wherein the operation is applied based on the update to the first data;
determining a first solution to the one or more equations based on the second intermediate data and the algorithm; and
updating the output data based at least in part on the second data.

20. The method of claim 19, wherein applying the operation to the first intermediate data comprises:
generating the second intermediate data based on the update; and
evaluating an expression comprising both the first intermediate data and the second intermediate data.

21. The method of claim 19, wherein applying the operation to the first intermediate data comprises identifying a first portion of the first intermediate data and subtracting the first portion of the first intermediate data from a second portion of the first intermediate data.

22. The method of claim 19, wherein determining the first solution of the one or more equations comprises determining a basis based on the second intermediate data and performing a factorization based on the basis.

23. The method of claim 19, further comprising determining a second solution to the one or more equations based on the first intermediate data and the algorithm.

24. The method of claim 9, further comprising loading the stored first set of intermediate data in response to receiving the second set of data.

25. The method of claim 24, further comprising updating the loaded first set of intermediate data to generate a second set of intermediate data, and wherein updating the basis for the factorization comprises updating the basis for the factorization based on the second set of intermediate data.

26. The method of claim 25, wherein the second set of intermediate data comprises a second plurality of scalar values.

* * * * *